United States Patent
Kostic et al.

(10) Patent No.: US 9,232,284 B2
(45) Date of Patent: *Jan. 5, 2016

(54) METHOD AND SYSTEM FOR SHARING RESOURCES FOR SETUP BOXES (STB) IN A HOME NETWORK

(71) Applicant: Broadcom Corporation, Irvine, CA (US)

(72) Inventors: Predrag Kostic, Burnaby (CA); Nicos Herodotou, Fremont, CA (US); Rajesh Mamidwar, San Diego, CA (US); Sanjeev Sood, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 13/712,364

(22) Filed: Dec. 12, 2012

(65) Prior Publication Data

US 2013/0097633 A1 Apr. 18, 2013

Related U.S. Application Data

(63) Continuation of application No. 12/511,677, filed on Jul. 29, 2009, now Pat. No. 8,370,881.

(51) Int. Cl.
| | |
|---|---|
| *H04N 7/18* | (2006.01) |
| *H04N 21/81* | (2011.01) |
| *H04N 7/10* | (2006.01) |
| *H04N 21/4147* | (2011.01) |
| *H04N 21/426* | (2011.01) |
| *H04N 21/433* | (2011.01) |

(Continued)

(52) U.S. Cl.
CPC .............. *H04N 21/812* (2013.01); *H04N 7/106* (2013.01); *H04N 21/4147* (2013.01); *H04N 21/4263* (2013.01); *H04N 21/4334* (2013.01); *H04N 21/43622* (2013.01); *H04N 21/44227* (2013.01)

(58) Field of Classification Search
CPC ............ H04N 21/43615; H04N 7/106; H04N 7/17318; H04N 21/47202; H04N 7/18; H04N 21/64322; H04N 21/2143; H04N 21/42204; G06Q 10/02; G06Q 30/0613; G06Q 30/0625; G06Q 10/10; G06Q 30/02; H04L 29/08549; H04L 29/08072; H04L 29/06; H04L 29/0809; H04L 29/08117; G06F 15/167; G06F 3/067; G06F 17/3089; G06F 10/10

See application file for complete search history.

(56) References Cited

U.S. PATENT DOCUMENTS

| | | |
|---|---|---|
| 7,430,753 B2 | 9/2008 | Gray et al. |
| 8,370,881 B2 | 2/2013 | Kostic et al. |

(Continued)

*Primary Examiner* — Ngoc Vu
(74) *Attorney, Agent, or Firm* — Foley & Lardner LLP; Joseph N. Ziebert; Helen H. Zhang

(57) ABSTRACT

A STB resource sharing (RS) group of a home network comprises a plurality of STBs. In the STB RS group, a STB communicates with one or more other STBs to mutually share available device resources comprising hardware and software resources, and/or capabilities. The STB functions as an elected master (EM) or a STB RS client in the STB RS group. As an EM, the STB receives advertisements from other STBs to determine available resources. The determined available resources are announced to other STBs in the STB RS group. The STB manages the use of the determined available resources according to resource sharing requests received from other STBs. As a STB RS client, the STB advertises inherent resources to an EM of the STB RS group. The STB receives announcements from the EM for available resources in the STB RS group. The STB shares its available resources, accordingly.

20 Claims, 6 Drawing Sheets

(51) Int. Cl.
*H04N 21/436* (2011.01)
*H04N 21/442* (2011.01)

(56) References Cited

U.S. PATENT DOCUMENTS

2002/0174444 A1    11/2002    Gatto et al.
2003/0003938 A1*   1/2003     O'Neill et al. ................ 455/519
2005/0102698 A1    5/2005     Bumgardner et al.
2006/0150244 A1    7/2006     Klein et al.
2006/0259957 A1    11/2006    Tam et al.
2008/0313691 A1*   12/2008    Cholas et al. ................ 725/131
2010/0020794 A1*   1/2010     Cholas et al. ................ 370/389

* cited by examiner

METHOD AND SYSTEM FOR SHARING RESOURCES FOR SETUP BOXES (STB) IN A HOME NETWORK

CROSS-REFERENCE TO RELATED APPLICATIONS/INCORPORATION BY REFERENCE

This application claims priority to, and the benefit of, U.S. Patent Application titled "A METHOD AND SYSTEM FOR SHARING RESOURCES FOR SETUP BOXES (STB) IN A HOME NETWORK," having Ser. No. 12/511,677, filed on Jul. 29, 2009, which is incorporated by reference in its entirety.

FIELD OF THE INVENTION

Certain embodiments of the invention relate to communication systems. More specifically, certain embodiments of the invention relate to a method and system for sharing resources for setup boxes (STB) in a home network.

BACKGROUND OF THE INVENTION

A home network is an Internet Protocol (IP) based network that interconnects various clients such as set-top boxes (STB), modern game computers, digital video recorders, and other electronic devices in a home to each other to access external networks through a home gateway for various IP-based services such as, for example, video broadcasting, video on demand, instant messaging, online conferencing, and/or Internet gaming in the home.

With increasing scalability of the clients such as personal digital video recorders, demand for a higher data rate is expected to increase inside the home network. For example, a high data rate is required for the home network to be evolved along with emerging video standards from standard definition (SD) to high definition (HD) to support applications such as HD TV in the home.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for sharing resources for setup boxes (STB) in a home network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing resources for setup boxes (STB) in a home network. In an exemplary embodiment of the invention, a STB resource sharing (RS) group of a home network comprises a plurality of STBs. One or more STBs of the plurality of STBs may be operable to communicate with one or more other STBs of the plurality of STBs for mutually sharing available resources in the STB RS group. In this regard, the mutual sharing of available resources comprises the sharing of available resources in both directions (bi-directional) two or more of the plurality of STBs. The available resources in the STB RS group may comprise hardware resources, software resources, and/or capabilities associated with the plurality of STBs in the home network. A STB in the STB RS group may be configured to function in a role as an elected master (EM) or a STB RS client.

When functioning as an EM, the STB may be operable to receive advertisements from each of other STBs in the STB RS group. The STB may be operable to determine available resources in the STB RS group from the received advertisements. The STB may be operable to announce the determined available resources to the plurality of STBs in the STB RS group. The STB may be operable to receive one or more requests from other STBs for sharing the determined available resources of the STB RS group. The STB may be operable to manage the use of the determined available resources in the STB RS group based on the received requests from other STBs.

When functioning as a STB RS client, the STB may be operable to advertise inherent resources to an EM of the STB RS group. The STB may be operable to receive announcements from the EM. The STB may be operable to identify desired available resources from the received announcements. The STB may be operable to send a request to the EM for sharing the identified desired available resources. The STB may be operable to share the identified desired available resources in the STB RS group after being granted by the EM.

Figure 1:
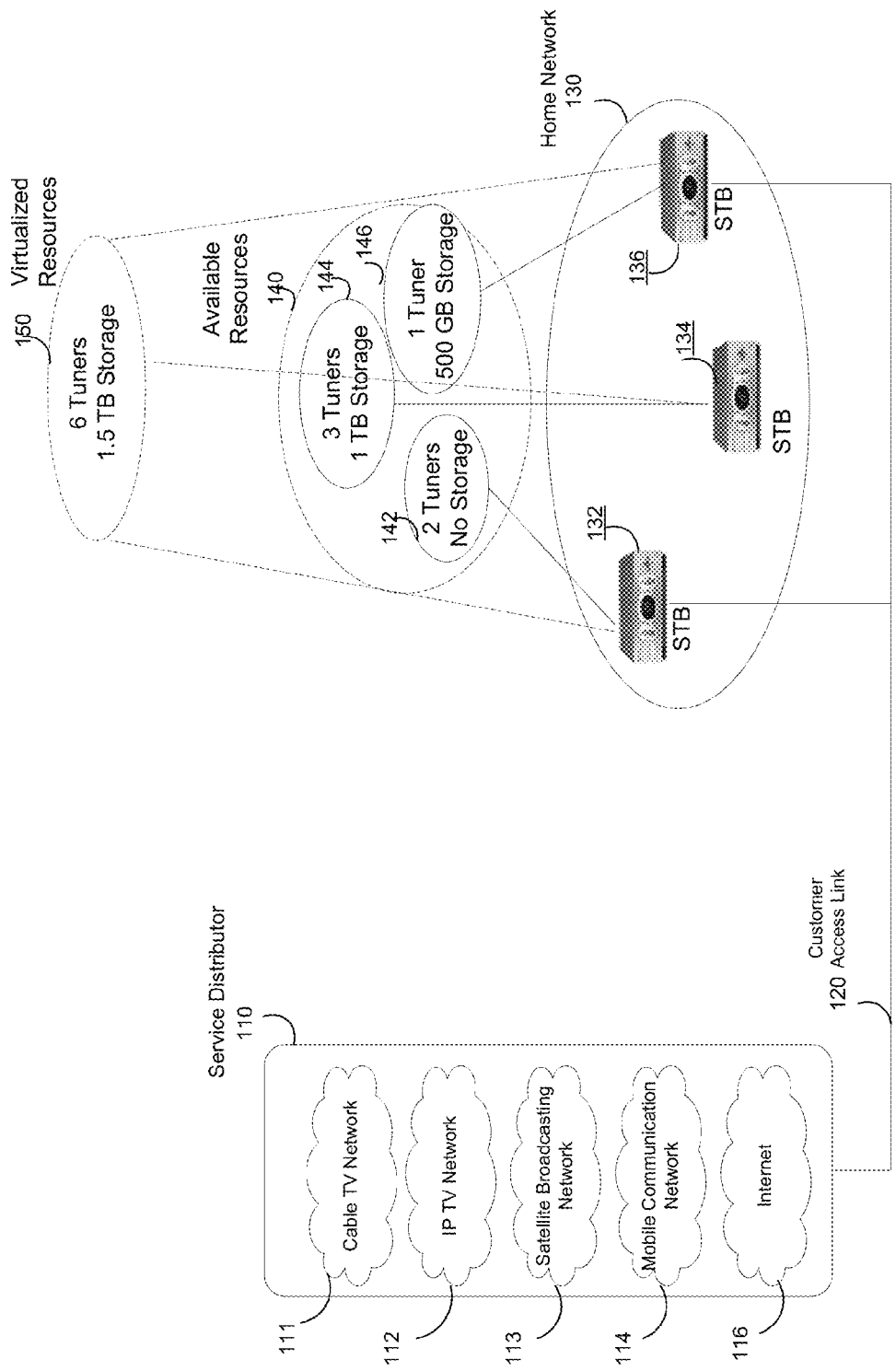
FIG. 1 is a diagram illustrating an exemplary home network system that is operable to share available resources between STBs connected in a home network, in accordance with an embodiment of the invention.

FIG. 1 is a diagram illustrating an exemplary home network system that is operable to share available resources between STBs connected in a home network, in accordance with an embodiment of the invention. Referring to FIG. 1, there is shown a home network system 100.

The home network system 100 may comprise a service distributor 110, a customer access link 120 and a home network 130. The service distributor 110 may comprise a cable TV network 111, an IP TV network 112, a satellite broadcasting network 113, a mobile communication network 114 and/or Internet 116, respectively. The home network 130 may comprise a plurality of electronic devices, of which settop boxes (STBs) 132-136 are displayed. The home network 130 may comprise resources 140. The resources 140 comprise available resources 142-146 owned by the STBs 132-136, respectively. Depending on capacities of the STBs 132-136, available resources of each associated STB may vary. For example, the available resources 142 owned by the STB 132 may comprise two tuners and no storage. The available resources 144 owned by the STB 134 may comprise three tuners and 1 TB storage. The available resources 146 owned by the STB 136 may comprise one tuner and a 500 GB storage. Accordingly, resulting available resources within the home network 130 may comprise 6 tuners and a 1.5 TB storage. The resulting available resources of the entire STBs within the home network 130 may be referred as virtualized resources 150.

The home network system 100 may be operable to provide various IP-based services from the service distributor 110 to the home network 130 via the customer access link 120.

The service distributor 110 may comprise suitable logic, circuitry, interfaces and/or code that may be operable to distribute contents of IP-based services to the home network 130. The service distributor 110 may be configured to provide capacity and/or various capabilities such as, for example, distribution, multicast, and/or quality of service necessary for a reliable and timely transmission of contents of the IP-based services to the home network 130. The service distributor 110 may be configured to utilize, for example, the cable TV network 111, the IP TV network 112, the satellite broadcasting network 113, and/or the mobile communication network 114, for the delivery of the IP-based services to the home network 130 over the customer access link 120.

The customer access link 120 may comprise suitable logic, circuitry, interfaces and/or code that may enable the delivery of IP-based services from the service distributor 110 to the home network 130. Depending on the richness of IP-based service offerings, the customer access link 120 may be implemented using various technologies such as, for example, Home Plug Technology, HPNA, HomeGrid technology, higher-speed DSL technologies, Fiber-to-the-Home (FTTH) access technology or a combination of Fiber-to-the Curb (FTTC) and DSL technologies.

The home network 130 may comprise suitable logic, circuitry, interfaces and/or code that are operable to connect multiple electronic devices such as the STBs 132-136 within the home. The home network 130 may be operable to communicate with the service distributor 110 to provide IPTV services over various home networking technologies such MoCA, Ethernet, and Wireless Ethernet.

A home network (HN) device such as the STB 134 may comprise suitable logic, circuitry, interfaces and/or code that are operable to acquire desired IP-based services from the service distributor 110 and deliver to users in the home. The STB 134 may be operable to perform functions such as channel tuning to extract channels for delivering the desired IP-based services such as IPTV service to users in the home. The STB 134 may be operable to manage channel change functionality, user display control, and/or connections to user appliances such as a standard-definition TV (SDTV) or a high-definition TV (HDTV) monitors. The STB 134 may be associated with a STB resource sharing (RS) group of the home network 130. Within the STB RS group, each associated STB such as the STB 134 may be configured to mutually share its own available resources with other STBs.

Virtualized resources 150 are apparent to each of associated STBs such as the STBs 132-136. The STBs 132-136 may be operable to directly communicate each other for mutually sharing the virtualized resources 150. In this regard, the mutual sharing of the virtualized resources 150 comprises the sharing of the virtualized resources 150 in both directions among the STBs 132-136. For example, the STB 134 may be operable to receive a desired program by using a tuner owned by other associated STBs such as the STB 136. The STB 134 may be operable to share its own available resources such as storage with other STBs such as the STB 132. The STB 134 may be operable to use its own tuner to receive a specific program targeted to different STBs such as the STB 132. The STB 134 may be operable to record contents of the received specific program in its own storage. The STB 134 may be operable to encapsulate the recorded contents of the specific program into, for example, TCP/UDP packets, and communicate with the STB 132 to present the specific program on user appliances such as a TV monitor served by the STB 132.

In Cable TV environments, each of STBs 132-136 may be operable to support a CableCard, which may be utilized to decrypt video streams. A CableCard on a particular STB such as the STB 132 may be shared by other STBs such as the STB 134. In this regard, the STB 134 may be operable to remove an equipped CableCard and/or share a CableCard on other STBs such as, for example, the STB 132 to reduce cost. In instances where the STB 132 may be equipped with a MCard type CableCard, the STB 132 may be capable of decrypting up to 6 simultaneous video streams.

Within the STB RS group, an associated STB such as the STB 134 may be configured to function as an elected master (EM) or a STB RS client. As an EM, the STB 134 may be operable to collect resource advertisements from each STB in the STB RS group. The STB 134 may be operable to determine available resources based on the collected resource advertisements. The available resources may be announced to STBs in the STB RS group. The STB 134 may be operable to manage the use of the available resources according to requests received directly from one or more STBs in the STB RS group of the home network 130. As a STB RS client, the STB 134 may be operable to run software applications to advertise available hardware resources, device software resources and/or device capabilities within the STB RS group. The STB 134 may be operable to allow use of its inherent advertised resources by other STBs in the STB RS group. The STB 134 may be operable to request use of advertised resources from other STBs in the STB RS group when need.

In operation, the service distributor 110 may be operable to distribute contents of IP-based services to the home network 130 over the customer access link 120, which may be implemented via, for example, higher-speed DSL technologies. A home network server in the home network 130 may be operable to transmit the contents such as audio-video (AV) contents of the IP-based services from the service distributor 110 to an intended STB such as the STB 134. The STB 134 may be associated with a STB RS group of the home network 130 for sharing available resources. The STB 134 may be configured to share its inherent resources with other STBs such as the STBs 132-136 in the STB RS group. The STB 134 may be configured to share available resources in the STB RS group when need. Depending on corresponding configuration of the home network 130, the STB 134 may operate as an elected master (EM) or a STB RS client in the STB RS group.

Figure 2:
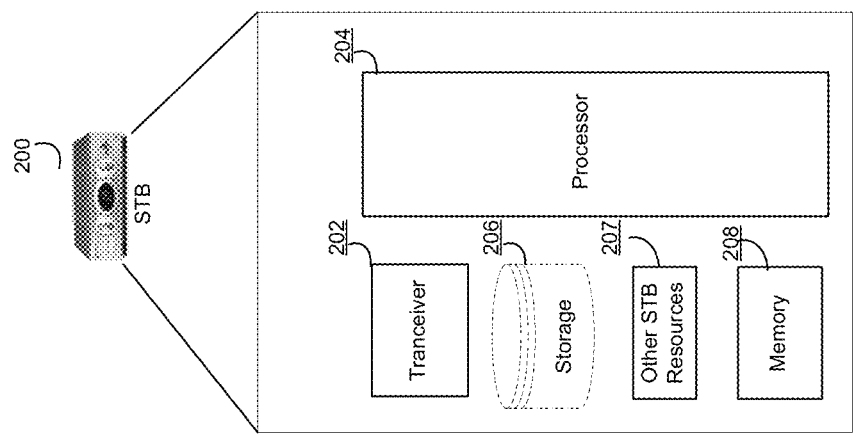
FIG. 2 is a block diagram illustrating an exemplary STB that shares resources with other STBs within a STB resource sharing group in a home network, in accordance with an embodiment of the invention.

FIG. 2 is a block diagram illustrating an exemplary STB that shares resources with other STBs within a STB resource sharing group in a home network, in accordance with an embodiment of the invention. Referring to FIG. 2 there is shown a set top box (STB) 200. The STB 200 comprises a transceiver 202, a processor 204, storage 206, other STB resources 207 and a memory 208.

The transceiver 202 may comprise suitable logic, circuitry, interfaces and/or code that are operable to receive contents such as audio-video (AV) contents of the IP-based services from the service distributor 110 and deliver to user appliances such as a TV monitor in the home. The transceiver 202 may be integrated within the STB 200. The transceiver 202 may be utilized for transmission and/or reception of wired and/or wireless signals at any suitable frequency.

The processor 204 may comprise suitable logic, circuitry, interfaces and/or code that are operable to control and/or manage data processing operations for the STB 200. The STB 200 may function in a role as an EM or a STB RS client in the STB RS group. Depending on the functional role of the STB 200 in the STB RS group, the processor 204 may be operable to perform various functional processing, for example, announcing available resources in the STB RS group, advertising its inherent available resources, and/or requesting mutually sharing available resources with other STBs in the STB RS group. The processor 204 may be operable to communicate directly with other STBs within the STB RS group for mutually sharing available resources.

When functioning as an EM, the processor 204 may be operable to establish a STB RS group of the home network 130 with corresponding STBs that may be operable to support resource sharing among STBs in the home network 130. The processor 204 may be operable to collect advertisement messages from STBs in the established STB RS group. The contents of the collected advertisement messages may be utilized to keep track of advertised resources within the STB RS group. The processor 204 may be operable to determine available resources in the established STB RS group. The determined available resources may be announced periodically or aperiodically to STBs within the established STB RS group. In an exemplary embodiment of the invention, the available resources may be announced as they become available, when changes to their configuration or status occur, and/or when new STBs are added to the STB RS group. The processor 204 may be operable to manage the use of the determined available resources to meet requests from one or more STBs in the established STB RS group. The usage of the determined available resources may be managed according to, for example, STB priority and/or amount of requested resources.

When functioning as a STB RS client, the processor 204 may be operable to send a request to an EM for joining a STB RS group. The processor 204 may be operable to advertise its inherent available resources such as tuners to the EM of the STB RS group. The processor 204 may be operable to allow other STBs within the STB RS group to share its available advertised resources. The processor 204 may be operable to receive announcements from the EM of the STB RS group. The processor 204 may be operable to identify available resources in the STB RS group from the received announcements. The processor 204 may be operable to send a request for sharing the announced available resources in the STB RS group to the EM when need. The processor 204 may be operable to be granted by the EM to utilize the announced available resources.

The storage 206 may comprise suitable logic, circuitry, interfaces and/or code that may be operable to record and store preferred contents of IP-based services. The storage 206 is an optional component for the STB 200. The stored contents of IP-based services may be provided to the processor 204 to support various applications such as, for example, specific programs in IPTV service. Contents in the storage 206 and/or the capacity of the storage 206 may be shared among STBs in the STB RS group of the home network 130. The storage 206 may comprise magneto- and/or optical drives such as a hard disk. The storage 206 may also comprise solid state memory such as flash memory and/or other suitable electronic data storage capable of recording and storing data and instructions.

The other STB resources 207 may comprise suitable logic, circuitry, interfaces and/or code that may be operable to provide various resources such as tuners and/or Cable card to support various tasks. For example, a tuner may be used to receive signals in specific channels. The other STB resources 207 may be shared among STBs in the STB RS group of the home network 130.

The memory 208 may comprise suitable logic, circuitry, interfaces and/or code that enable storage of data and/or other information utilized by the processor 204. For example, the memory 208 may be utilized to store processed data generated by the processor 204. The memory 208 may be operable to store information, such as available resources in the STB RS group.

In an exemplary operation, the STB 200 may be operable to function in the role as an EM in the home network 130. The STB 200 may be operable to establish a STB RS group for sharing resources within the home network 130. The processor 204 may be operable to collect or gather available resource information from advertisements of STBs in the established STB RS group. The processor 204 may be operable to determine available resources in the STB RS group based on the collected available resource information. The processor 204 may be operable to announce the determined available resources to STBs in the STB RS group. The processor 204 may be operable to manage the usage of the determined available resources based on, for example, STB priority and/or amount of requested resources, to satisfy device sharing requests from one or more STBs within the STB RS group.

In another exemplary operation, the STB 200 may be operable to function in the role as a STB RS client. The processor 204 may be operable to send a request to an EM such as the STB 134 to join in a STB RS group of the home network 130. The processor 204 may be operable to advertise resources periodically or aperiodically to the EM in the STB RS group. The processor 204 may be operable to allow the use of the advertised resources by other STBs in the STB RS group. The processor 204 may be operable to receive announcements from the STB 134 for available resources within the STB RS group. The processor 204 may be operable to request usage of the announced available resources in the STB RS group.

Figure 3:
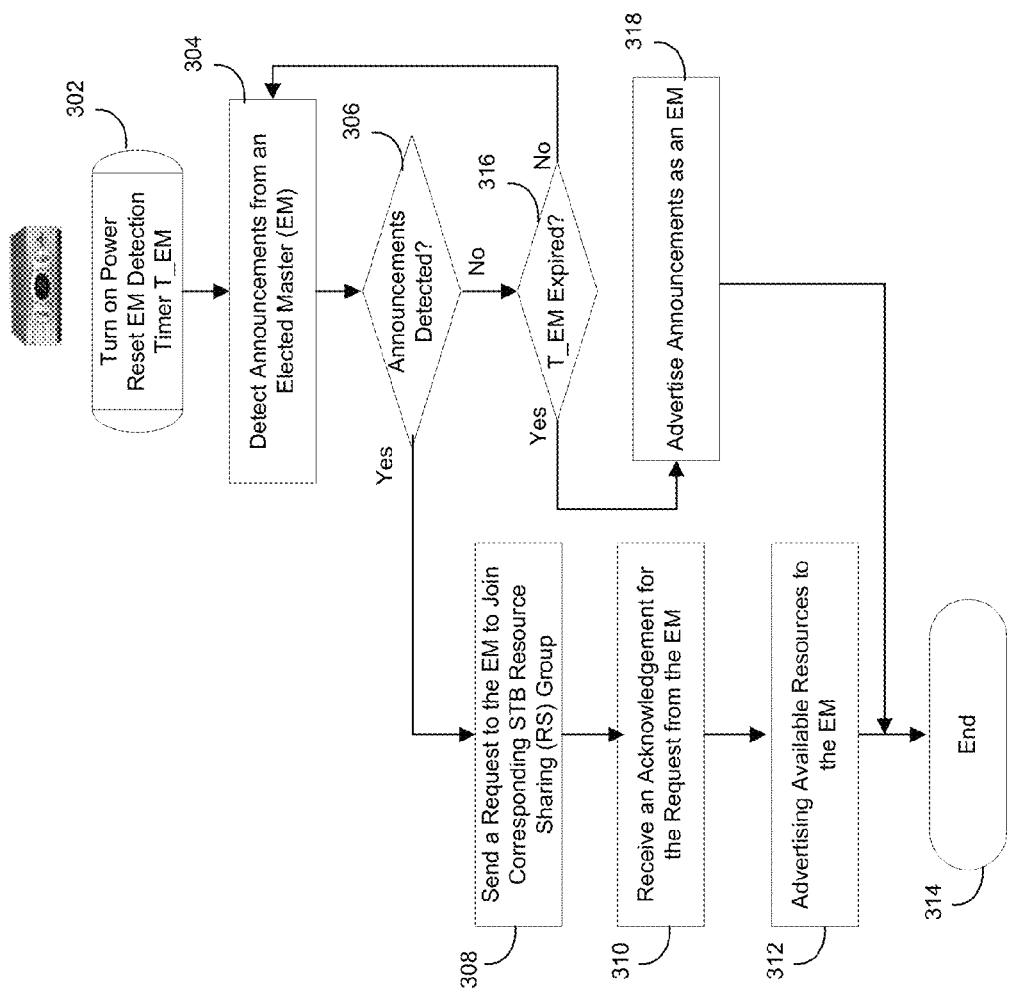
FIG. 3 a flow chart illustrating an exemplary STB resource sharing group establishment procedure in home network, in accordance with an embodiment of the invention.

FIG. 3 a flow chart illustrating an exemplary STB resource sharing group establishment procedure in home network, in accordance with an embodiment of the invention. Referring to FIG. 3, the exemplary steps start with the step 302, where the power of a STB such as the STB 134 is turned on. An EM detection timer T_EM may be reset. The EM detection timer T_EM may be utilized to detect presence of an EM. For example, in instances when the EM detection timer T_EM expires before EM announcements may be detected, the STB 134 may assume to be the role of an EM. In step 304, the STB 134 may be operable to detect announcements from the STB 136. In step 306, it may be determined that if announcements from the STB 136 are detected. In instances where announcements may be detected by the STB 134, then in step 408, the STB 134 may be operable to send a request to the STB 136 to join corresponding STB RS group. In step 310, the STB 134 may be operable to receive an acknowledgement from the STB 136 in response to the request. In step 312, the STB 134 may be operable to advertise its inherent available resources to the STB 136. The available resources may comprise, for example, device hardware resources like tuners and storage, device software resources, and various device capabilities such as device networking capabilities. The exemplary process may stop in step 314.

In step 306, in instances where the announcements may not be detected by the STB 134 within the time period of the EM detection timer T_EM, then in step 316, it may be determined whether or not the EM detection timer T_EM expires. In instances where the EM detection timer T_EM expires, then in step 318, the STB 134 may be operable to function in the role as an EM in the home network 130. The STB 134 may be operable to establish a STB RS group with corresponding STBs in the home network 130. The STB 134 may be operable to collect available resource information within the established STB RS group. The information of the collected available resources within the established STB RS group may be announced periodically or aperiodically to STBs within the STB RS group. The exemplary steps may stop in step 314.

In step 316, in instances where the EM detection timer T_EM has not expired, the exemplary steps return to step 304.

Figure 4:
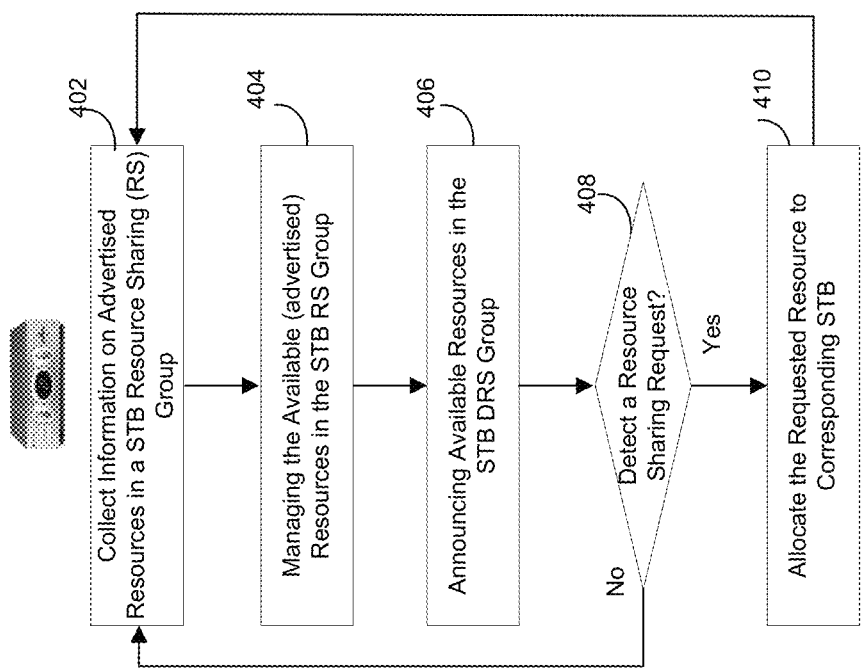
FIG. 4 is a flow chart illustrating an exemplary resource management procedure used in a STB resource sharing group of a home network, in accordance with an embodiment of the invention.

FIG. 4 is a flow chart illustrating an exemplary resource management procedure used in a STB resource sharing group of a home network, in accordance with an embodiment of the invention. Referring to FIG. 4, the exemplary steps start with the step 402, where a STB such as the STB 134 may function in the role as an EM in a STB RS group in the home network 130. The STB 134 may be operable to collect information on advertised resources in a STB RS group of the home network 130. In step 404, the STB 134 may be operable to manage the available (advertised) resources in the STB RS group. In step 406, the STB 134 may be operable to advertise announcements of available resources to other STBs in the STB RS group. In step 408, it may be determined whether or not requests for resource sharing from one or more STBs such as the STB 132 may be detected. In instances where a request for resource sharing may be detected by the STB 134, in step 410, the STB 134 may be operable to manage and/or allocate the requested resource to the STB 132. The exemplary steps return to step 402.

In step 408, in instances where a request for resource sharing may be detected by the STB 134, the exemplary steps return to step 402.

Figure 5:
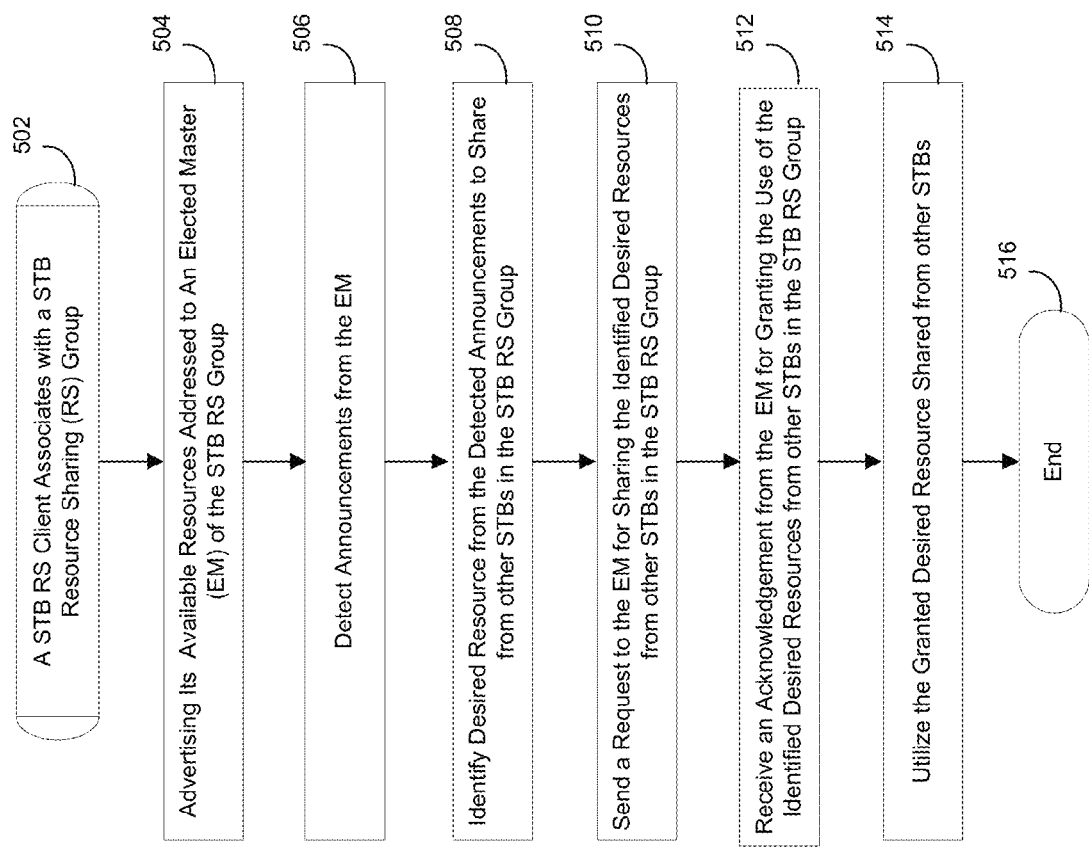
FIG. 5 is a flow chart illustrating an exemplary resource acquisition procedure used in a STB resource sharing group of a home network, in accordance with an embodiment of the invention.

FIG. 5 is a flow chart illustrating an exemplary resource acquisition procedure used in a STB resource sharing group of a home network, in accordance with an embodiment of the invention. Referring to FIG. 5, the exemplary steps start with the step 502, where a STB such as the STB 134 may function in the role as a STB RS client in a STB RS group of the home network 130. In step 504, the STB 134 may be operable to advertise its inherent available resources to an EM such as the STB 136 of the STB RS group.

In step 506, the STB 134 may be operable to detect announcements from the STB 136. In step 508, the STB 134 may be operable to identify desired resources to share from other STBs in the STB RS group from the detected announcements. In step 510, the STB 134 may be operable to send a request to the STB 136 for sharing the identified desired resources from other STBs in the STB RS group. In step 512, the STB 134 may be operable to receive an acknowledgement from the STB 136 for granting the use of the identified desired resources from other STBs in the STB RS group in response to the request. In step 514, the STB 134 may be operable to utilize the granted desired resource, which may be shared among the STBs in the STB RS group of the home network 130. The exemplary steps stop in step 516.

Figure 6:
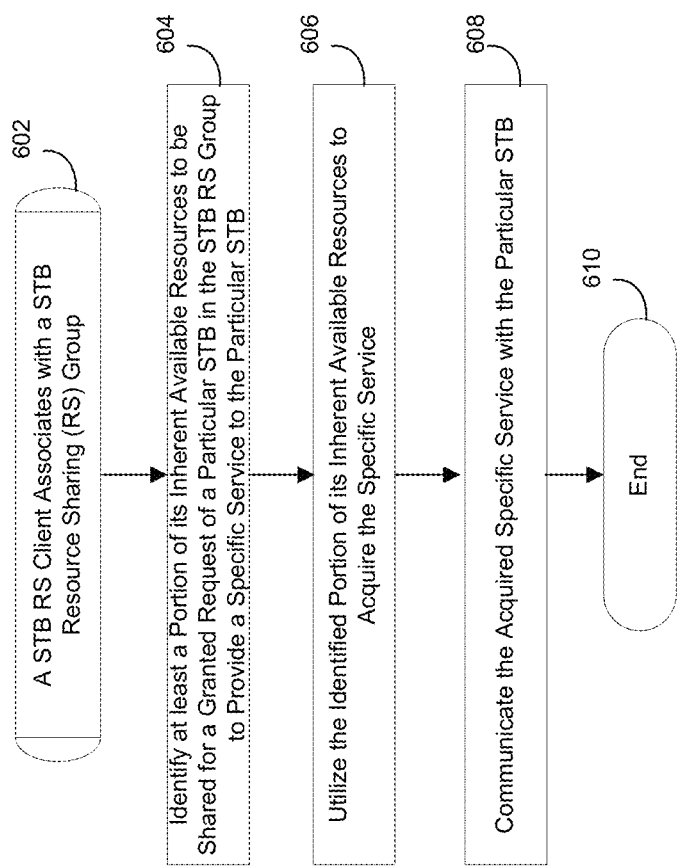
FIG. 6 is a flow chart illustrating an exemplary resource sharing procedure used in a STB resource sharing group of a home network, in accordance with an embodiment of the invention.

FIG. 6 is a flow chart illustrating an exemplary resource sharing procedure used in a STB resource sharing group of a home network, in accordance with an embodiment of the invention. Referring to FIG. 6, the exemplary steps start with the step 602, where a STB such as the STB 134 may function in the role as a STB RS client in a STB RS group of the home network 130. In step 604, the STB 134 may be operable to identify at least a portion of its inherent available resources such as a tuner to be shared for a granted request of a particular STB such as the STB 132 in the STB RS group in order to provide a specific service such as a TV program to the STB 132. In step 606, the STB 134 may be operable to utilize the identified portion of its inherent available resources to acquire the specific service. In step 608, the STB 134 may be operable to communicate the acquired specific service with the STB 132. The exemplary steps stop in step 610.

Aspects of a method and system for sharing resources for setup boxes (STB) in a home network are provided. In accordance with various embodiments of the invention, a STB RS group of the home network 130 comprises a plurality of STBs such as the STBs 132-136. One or more STBs such as the STB 134 of the plurality of STBs may be operable to communicate with one or more other STBs such as the STBs 132 and 136 of the plurality of STBs for mutually sharing available resources in the STB RS group. In this regard, the mutual sharing of available resources comprises the sharing of available resources in both directions between two or more of the plurality of STBs. The available resources in the STB RS group may comprise hardware resources, software resources, and/or capabilities associated with the plurality of STBs such as the STBs 132-136. The STB 134 may be configured to function in a role as an elected master (EM) or a STB RS client.

When functioning as the EM, as described with respect to FIG. 1, FIG. 3, and FIG. 4, the STB 134 may be operable to receive advertisements from each of STBs such as the STB 132 and the STB 136 within the STB RS group. The STB 134 may be operable to collect information about available resources in the STB RS group from the received advertisements. The STB 134 may be operable to determine available resources in the STB RS group according to the collected information. The STB 134 may be operable to announce the determined available resources to the plurality of STBs such as the STB 132 and the STB 136 within the STB RS group. The STB 134 may be operable to receive one or more requests from one or more other STBs, for example, the STB 132 and the STB 136 for sharing the determined available resources of the STB RS group. The STB 134 may be operable to manage the use of the determined available resources in the STB RS group based on the received requests from other STBs.

When functioning as a STB RS client, as described with respect to FIG. 1, FIG. 2, FIG. 3, FIG. 5 and FIG. 6, the STB 134 may be operable to advertise inherent resources to an EM client such as the STB 136 of the STB RS group. The STB 134 may be operable to receive announcements from the STB 136. The STB 134 may be operable to identify desired available resources from the received announcements. The STB 134 may be operable to send a request to the STB 136 for sharing the identified desired available resources. The STB 134 may be operable to be granted by the STB 136 for the use of the identified desired available resources. The STB 134 may be operable to share the identified desired available resources in the STB RS group.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for sharing resources for setup boxes (STB) in a home network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   receiving, by a master device, an advertisement message from a first device, the advertisement message advertising an availability of a resource inherent to the first device;
   sending, by the master device to at least one additional device, an announcement of the resource inherent to the first device, the announcement being based at least in part on the advertisement message from the first device, wherein the at least one additional device comprises a second device;
   detecting, by the master device, a resource sharing request sent from the second device for sharing the resource inherent to the first device, the resource sharing request being received in response to the announcement; and
   in response to the detected resource sharing request, allocating, by the master device, at least a portion of the resource inherent to the first device to the second device, wherein the resource is shared between the first device and the second device.

2. The method of claim 1, wherein at least one of the master device, the first device, or the second device comprises a set-top box (STB).

3. The method of claim 1, wherein the resource inherent to the first device is a video stream decryption resource.

4. The method of claim 1, wherein sending the announcement comprises sending the announcement periodically.

5. The method of claim 1, wherein receiving the advertisement message comprises receiving, from a plurality of devices, a respective advertising message.

6. The method of claim 1, wherein the master device is elected as an elected master by at least one of the first device or the second device.

7. The method of claim 1, wherein the resource comprises at least one of a tuner or a CableCard.

8. A system for communication, the system comprising:
   one or more processors, one or more circuits, or any combination thereof implemented in a first device, the one or more processors, the one or more circuits, or the combination thereof being configured to:
      detect an announcement of an available resource inherent to a second device, the announcement being sent from a master device and being based at least in part on an advertisement message sent from the second device to the master device for advertising the available resource;
      identify at least a portion of the available resource inherent to the second device indicated in the announcement as a desired resource;
      send, to the master device, a request for sharing the desired resource inherent to the second device; and
      receive, from the master device, an acknowledgement for granting a use of the desired resource inherent to the second device, wherein the desired resource is shared between the first device and the second device.

9. The system of claim 8, wherein the first device comprises a set-top box (STB).

10. The system of claim 8, wherein the one or more processors, the one or more circuits, or the combination thereof is configured to utilize the desired resource, the desired resource being shared from the second device.

11. The system of claim 8, wherein the desired resource comprises an internet-protocol (IP) based service.

12. The system of claim 8, wherein the one or more processors, the one or more circuits, or the combination thereof is configured to advertise, to the master device, a resource inherent to the first device for sharing the resource with another device.

13. The system of claim 12, wherein the announcement indicates the resource inherent to the first device.

14. The system of claim 8, wherein the available resource comprises at least one of a tuner or a CableCard.

15. A system for communication, the system comprising:
   one or more processors, one or more circuits, or any combination thereof implemented in a first device, the one or more processors, the one or more circuits, or the combination thereof being configured to:
      send an advertisement message of an available resource inherent to the first device to a master device for the master device to send an announcement of the available resource to at least one additional device, the announcement being based at least in part on the advertisement message sent from the first device for advertising the available resource, the at least one additional device comprising a second device; and
      share at least a portion of the available resource inherent to the first device with the second device.

16. The system of claim 15, wherein the first device, the master device, and the second device are included in a set-top box resource sharing group.

17. The system of claim 15, wherein the available resource comprises an internet-protocol (IP) based service.

18. The system of claim 15, wherein sharing the at least a portion of the available resource comprises encapsulating media content according to a data packet protocol for presentation of the media content at the second device.

19. The system of claim 15, wherein the one or more processors, the one or more circuits, or the combination thereof is further configured to periodically send the advertisement message.

20. The system of claim 15, wherein the available resource comprises at least one of a tuner or a CableCard.

* * * * *